Oct. 23, 1934.  G. C. MONCKMEIER  1,977,735
LUGGAGE AND TRUNK CARRIER
Filed Feb. 14, 1933   3 Sheets-Sheet 1
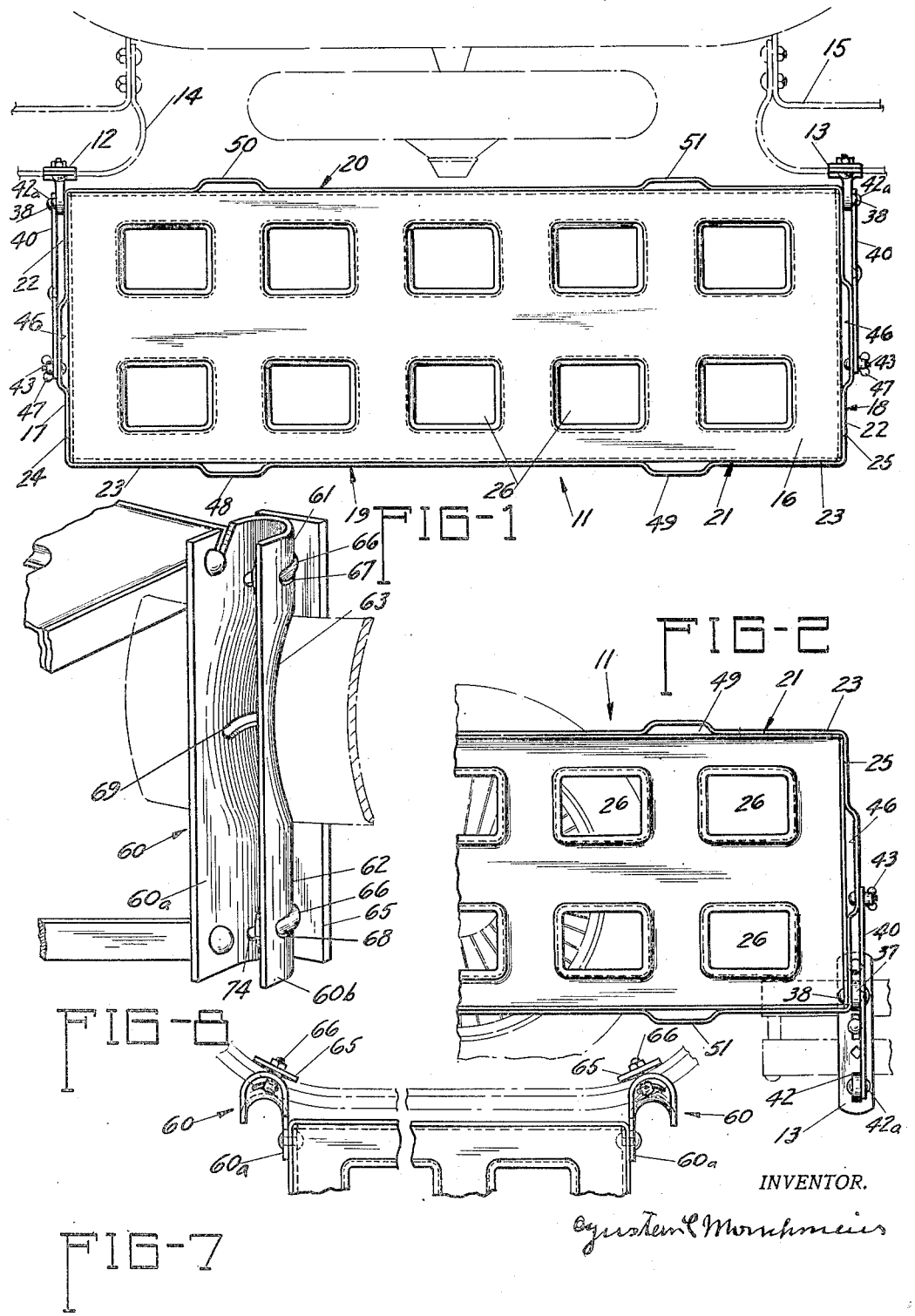
INVENTOR.
Gustav C Monckmeier Oct. 23, 1934.  G. C. MONCKMEIER  1,977,735
LUGGAGE AND TRUNK CARRIER
Filed Feb. 14, 1933  3 Sheets-Sheet 2

INVENTOR.
Gustav C. Monckmeier

Oct. 23, 1934.         G. C. MONCKMEIER         1,977,735
                    LUGGAGE AND TRUNK CARRIER
                    Filed Feb. 14, 1933        3 Sheets-Sheet 3
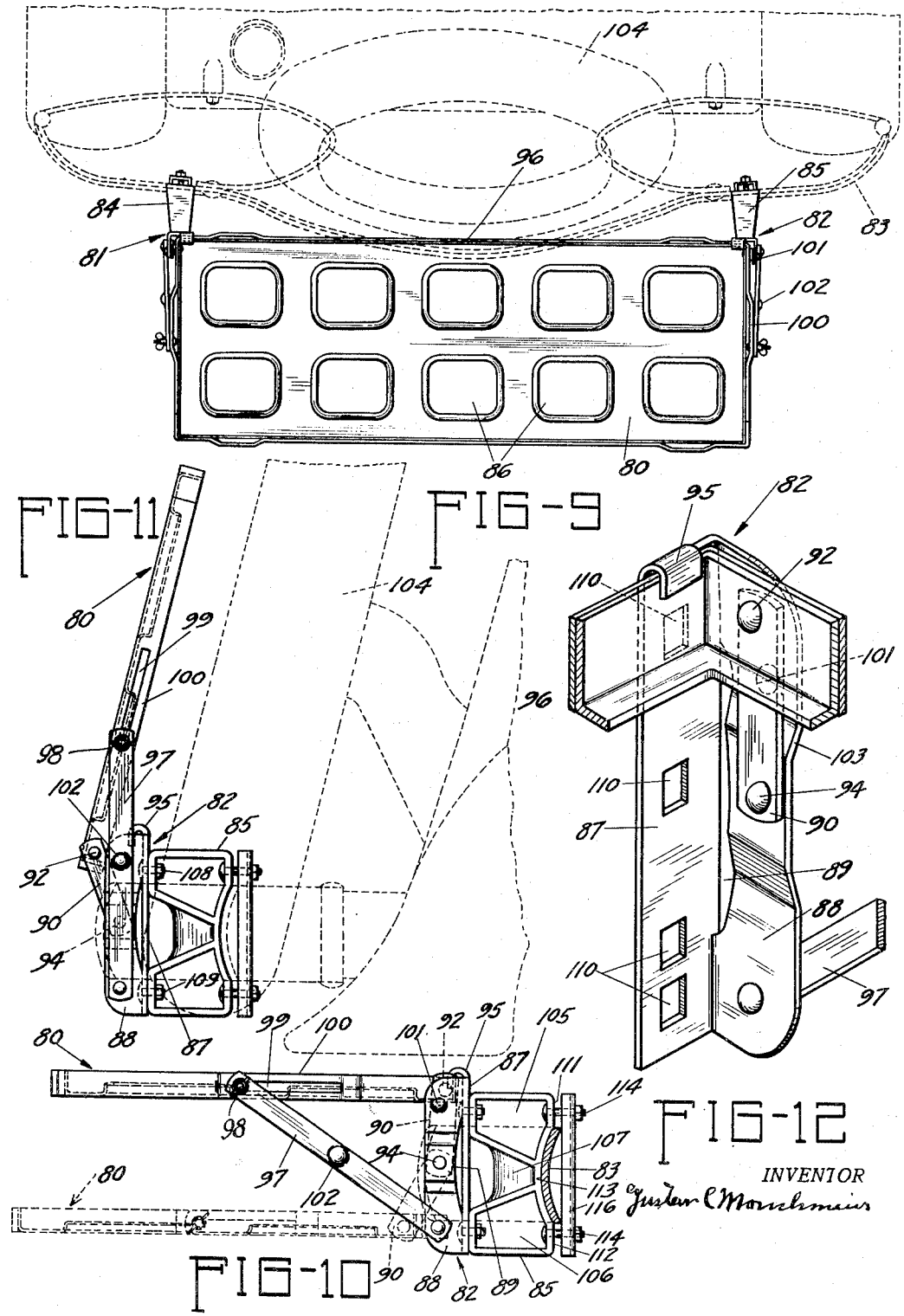
INVENTOR Patented Oct. 23, 1934

1,977,735

UNITED STATES PATENT OFFICE 1,977,735

LUGGAGE AND TRUNK CARRIER

Gustav C. Monckmeier, Davenport, Iowa

Application February 14, 1933, Serial No. 656,656

17 Claims. (Cl. 224—29)

My invention relates to luggage and trunk carriers, and particularly to the type adapted to be mounted on the bumper or bumperettes of an automobile.

The principal object of my invention is to provide a carrier having a rack of new and improved construction by virtue of which greater load carrying strength is obtained meanwhile permitting the use of much lighter material than has heretofore been necessary. A special feature of my improved rack construction is that it greatly improves the appearance of both sides of the rack. This is particularly desirable in a rack of the folding type wherein both sides of the rack are at different times exposed to view. I accomplish this object by constructing the rack of a rectangularly shaped piece of sheet metal bending the sides and ends of the rack downwardly at right angles to the plane of the rack, providing a reinforcing strip which embraces the rack and is affixed to the downturned portions of the sides and ends in juxtaposition therewith, and stamping out a plurality of openings in the surface of the rack and drawing the margins of the openings downwardly and then inwardly. This construction provides a strong and rigid rack even though sheet metal of a comparatively thin gauge is used. By double drawing the margins of the openings in the rack, the portion immediately adjacent the openings is brought in a plane parallel to the plane of the rack. This enhances the appearance of the rack, especially the bottom side thereof which is exposed to view when the rack is folded up to its non-carrying position.

A special feature of my improved rack construction resides in positioning the point of abutment of the ends of the reinforcing strip at a point spaced from the corners of the rack, the reinforcing strip thereby being continuous at the corners. This insures against failure of the rack at such points which would otherwise be points of weakness.

Another object of my invention is to provide a rack constructed of sheet metal and having its sides and ends bent at right angles to the plane of the rack with a reinforcing strip embracing the rack and fixed to the bent portions thereof, wherein strap loops are provided by offsetting short sections of the reinforcing strip outwardly in spaced relation to the front and rear ends of the rack.

Another object of my invention is to provide a rack constructed of sheet metal and having its sides and ends bent at right angles to the plane of the rack with a reinforcing strip embracing the rack and fixed to the bent portions thereof, wherein guides are provided for the supporting links for the rack by offsetting sections of the reinforcing strip outwardly in spaced relation to the sides of the rack, and slotting such outwardly bent sections to receive the pivot bolts connecting the links to the rack.

Another important object of my invention is to provide improved attaching fittings for the carrier especially adapted for attachment to the bumpers or bumperettes of widely different shapes and designs. My improved fittings comprise a vertical bar having upper and lower cylindrical transversely convex faces with a face intermediate the upper and lower faces which is concave vertically and convex transversely for engagement with convex surfaces. The vertically straight shaping of the upper and lower faces and the vertically concave shaping of the intermediate face adapt the fittings for clamping to a bumper of the type comprising two flat vertically spaced bars or to one of the type comprising a single bar of ovular cross section, as well as to a bumper comprising a single bar of sinusoidal cross section. Due to the transversely concave shaping of each of the three faces of the fittings, a carrier equipped therewith is adapted to be attached to bumpers having different degrees of curvature longitudinally, since the fittings will accommodate themselves to any particular angularity present between the portions of the bumpers at the points at which the two fittings of the carrier are attached.

Another object of the invention is to provide a collapsible carrier having novel means for holding the carrier in a collapsed position. I provide a rounded head on certain pivots on the rack fittings, and depressions in the links which hold the rack in its horizontal luggage receiving position, the depressions being so located that the heads of the pivots will be received therein when the rack is swung up into its inoperative position to lock the rack in such position.

Another object of the invention is to provide a carrier which may not only be swung from a horizontal luggage carrying position to a vertical inoperative position, but which also may be readily disengaged from its supports to permit it to be lowered to provide greater accessibility to the spare tire for removing or replacing the same. I accomplish this object by providing slots in the fittings for the pivots through which the rack is connected to the fittings. To disconnect the rack it is merely necessary to lift the rack to disengage the pivots from the slot. I also provide a thumb screw connection between the supporting links and the rack whereby the supporting links may be readily disconnected from the rack to permit the rack to be readily removed from its attaching fittings. I also accomplish this object in another manner, namely, by making the connection of the inner end of the rack with the fittings through a pair of relatively short links and providing a hook on the fittings to engage the rack, the arrangement being such that the hook cannot be disengaged from the rack until the rack is lifted to a certain raised position. After being lifted to such position, the hook becomes disengaged. The rack can then be lowered to a position affording accessibility to the spare tire, the inner end swinging downwardly about the short connecting links.

In this latter form of my invention I choose to reverse the position of the rack, that is, use what was the bottom of the rack as the top. In this position, the angularly bent front end portion, which in this case extends upwardly, forms a convenient means for engagement by the hooks on the fittings. Since the rack presents a finished appearance on both sides, either side may readily be used as the top without any sacrifice in attractiveness.

Another object of my invention is to provide a carrier with a pair of adapters to serve as spacers for the fittings to space the latter rearwardly sufficiently so that the rear edge of the rack will clear the bowed portion of the bumper, or any other part of the car or equipment carried at the rear such as the spare tire, when such projects rearwardly beyond the plane of the face of the bumpers at the point at which the fittings are connected.

The manner in which these objects and others not specifically mentioned are accomplished is shown and described in the following specification and drawings wherein is illustrated preferred embodiments thereof, although it is to be understood that in the invention in its broader aspects may be embodied in structures of other forms.

In the drawings:—

Figure 1 is a plan view of my improved luggage carrier shown connected to the rear bumperettes of an automobile, the bumperettes being of the type comprising two flat vertically spaced bars. The carrier is shown in its horizontal luggage carrying position;

Figure 2 is a fragmental rear view showing the carrier folded up into its vertical inoperative position, in which the bottom of the rack is exposed to view;

Figure 6:
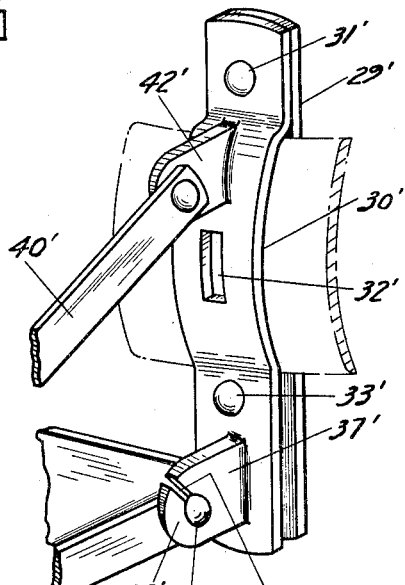

Figure 6 is a perspective view of a modified form of attaching fitting. This fitting is similar to that shown in Figures 1 to 3 except that it is adapted to have the rack connected thereto at its lower end and utilizes a tension supporting link connected to the upper end of the fitting, whereas in Figures 1 to 3 the rack is connected to the upper end of the attaching fitting and utilizes a compression supporting link. The fitting in Figure 6 is shown clamped to a bumper of the type comprising a single bar of ovular cross section.

Figure 7 is a plan view of a carrier equipped with my improved form of attaching fitting especially constructed for attachment to bumpers of different shapes and designs. In this figure the carrier is shown attached to a bumper of the type comprising a single bar of ovular cross section the manner in which the fittings accommodate themselves to the horizontally bent portions of the bumper to which they are clamped being illustrated;

Figure 8 is an enlarged fragmentary perspective view of the carrier for better illustration of the improved fitting;

Figure 9 is a plan view of a modified form of carrier equipped with adapters to adapt the carrier for connection to a rear bumper having a central rearwardly bent portion, as shown. The rack of this carrier is reversed to that of the carrier shown in Figures 1 to 8, and another improved form of fitting is illustrated;

Figure 10 is a side view of the carrier shown in Figure 9, shown in luggage receiving position in full lines, and in a lowered position to afford accessibility to the spare tire in dotted lines;

Figure 11 is a side view of the carrier of Figure 9 shown in its vertical inoperative position; and, Figure 12 is an enlarged fragmentary perspective view of the carrier of Figure 9 for better illustration of the improved attaching fitting thereof and the manner in which the rack is connected thereto.

The carrier shown in Figures 1 to 5 comprises a rack 11, supported on a pair of fittings 12 and 13 clamped to the bumperettes 14 and 15 of an automobile. The rack 11 is constructed of a rectangularly shaped piece of sheet metal 16 the sides 17 and 18 and ends 19 and 20 of which are bent downwardly at right angles to the plane of the rack. Square notches are cut out of the corners to facilitate this bending operation, the sides of the notches being brought into juxtaposition by that operation.

The downturned sides 17 and 18 and ends 19 and 20 are reinforced by means of a reinforcing strip 21 disposed in juxtaposition therewith and affixed thereto as by spot welding at a plurality of points. Reinforcing strip 21 is comprised of two sections 22 and 23, the two sections being affixed in position with the abutting ends at points 24 and 25 spaced an appreciable distance from the outer corners. This construction provides a continuous reinforcement at each of the corners and eliminates the likelihood of the corners of the rack tearing out as might happen if the points of abutment of the ends of the reinforcing strip sections coincided with the corners.

Figure 3:
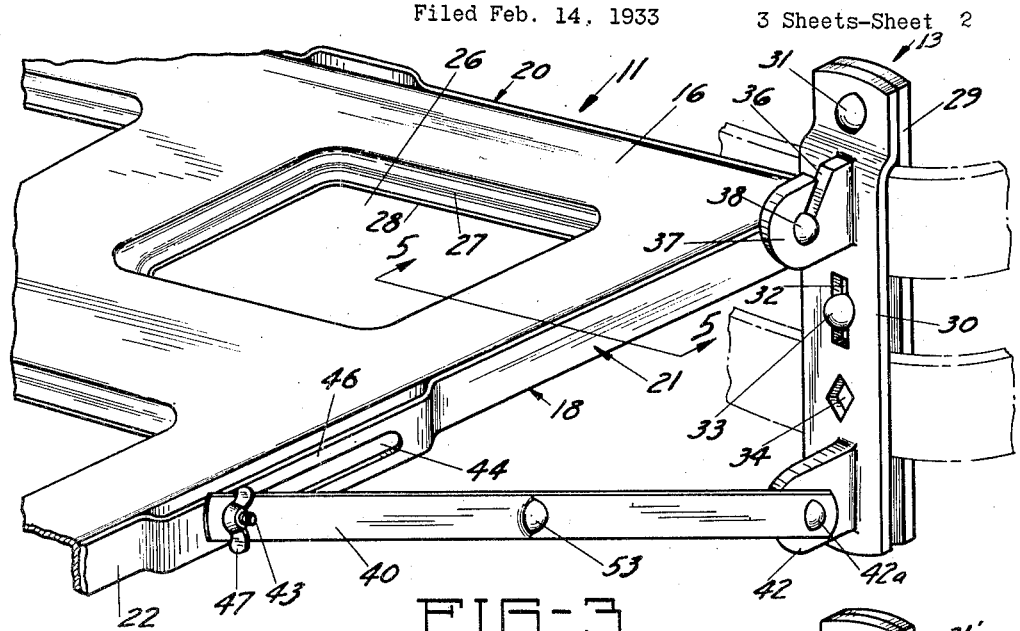
Figure 3 is an enlarged fragmentary perspective view of the carrier in its horizontal luggage carrying position for better illustration of the construction of the carrier elements.
Figure 5:
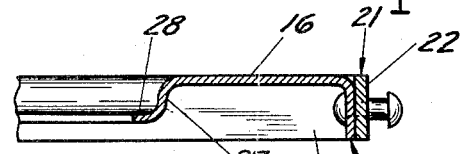
Figure 5 is a fragmentary cross-sectional view along the line 5—5 of Figure 3.

To enhance the appearance of the rack and increase the rigidity thereof, a plurality of openings 26 are stamped out and the margins thereof are drawn downwardly and also inwardly as best shown at 27 and 28 in Figures 3 and 5. Double drawing the margins in this manner I find adds greatly to the rigidity of the rack, over what would result from merely bending the margins of the openings in one direction. The double drawing of the margins of the openings 26 in cooperation with the reinforced downturned sides and ends of the rack give it the strength and rigidity necessary to support the heaviest loads and at the same time permits the use of lighter material for the rack. Furthermore, the inward bending of the metal immediately adjacent the openings into a plane parallel with the plane of the rack, as shown at 28, turns the edges away from view and gives the back of the rack, which is exposed to view when the rack is folded up, a pleasing appearance. For these reasons I regard the double draw and the reinforced downturned sides and ends an important feature of the invention.

The fittings 12 and 13 comprise two flat members 29 and 30 permanently riveted together by means of rivet 31. Member 30 is offset just below rivet 31 so as to be spaced from member 29 to provide space between the members for receiving the bumper bars. Aligned holes 32 are provided in members 29 and 30 near the middle thereof to receive clamping bolt 33 when the fittings are attached to a double bar bumper as shown. Below holes 32 another pair of aligned holes 34 are provided for use when attaching the fittings to single bar bumpers.

Rack 11 is pivotally and detachably connected to the two fittings by means of a pair of laterally extending pivoting pins 35 provided on opposite sides of the rack adjacent the front corners. Pin 35 rests in a downwardly and rearwardly inclined slot 36 in a lug 37 formed integral with member 30 and extending rearwardly therefrom near the upper end thereof. Head 38 on pin 35 prevents the pin from pulling out of the slot. When so positioned, the rack may be swung upwardly about pin 35 from its horizontal luggage receiving position shown in Figures 1 and 3 to its vertical inoperative position shown in Figures 2 and 4. The rack may also be readily disconnected from the fittings by merely raising its front end to lift pin 35 out of slot 36.

Rack 11 is held in horizontal position by a pair of supporting links 40, one on each side of the rack. Each link is pivotally connected to the adjacent fitting by a lug 42 formed integral with member 30 and extending rearwardly therefrom near the lower end thereof. The opposite end of the link 40 is slidably connected to the rack by means of a bolt 43 which projects through a slot 44 in a guide 46, one such guide being provided on each side of the rack. Bolt 43 extends through a perforation in link 40, the link being held in position by means of wing nut 47. Slots 44 are so positioned that when bolts 43 are against the rear end thereof the rack will be in its horizontal luggage receiving position. They are of such length as to permit the rack to be swung upwardly about pin 35 to its vertical inoperative position.

Guides 45 are formed in a novel manner, namely, by offsetting a portion of the reinforcing strip 22 outwardly in spaced relationship to the sides of the rack. In a similar manner a pair of spaced strap loops 48 and 49 are formed at the rear end of the rack, and another pair 50 and 51 at the front end and opposite the first pair.

The rack 11 may be lowered to afford accessibility to the spare tire if such is carried at the rear as indicated in Figure 1 in dotted lines, either by disconnecting links 40 from the rack by removing wing nuts 47 to permit the rack to be swung downwardly about pin 35, or by merely lifting the racking to remove the pins 35 from slots 36 to permit the rack to be lowered leaving the links 40 connected, or the rack may be freed from fittings 12 and 13 by doing both.

Figure 4:
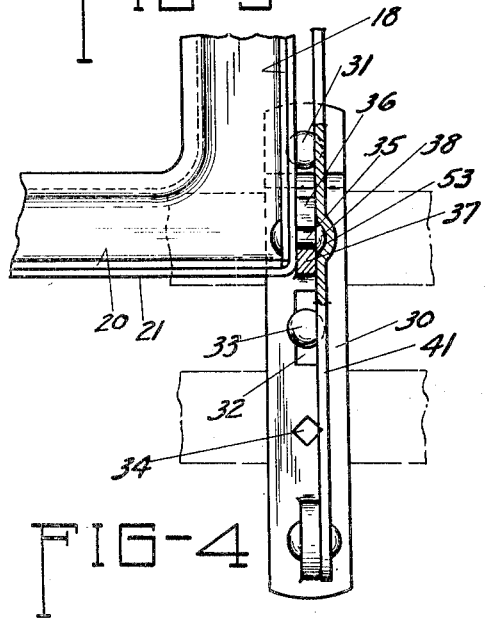
Figure 4 is an enlarged fragmentary rear view of the carrier in its vertical inoperative position with a portion of the supporting link and upper lug of the fitting shown in section to better illustrate the manner in which the rack is held in this position by the rounded heads of the pivots connecting the rack with the fittings engaging the depressions in the supporting links.

When the carrier is swung to its vertical position, it is held in such position by the engagement of the head 38 of pin 35 in depressions 53 formed in the inner side of links 40, as best shown in Figure 4. Depressions 53 are positioned a distance from pivots 42a equal to the distance between pivots 42a and pins 35. This provides a simple and effective way of locking the rack in inoperative position.

The modified form of attaching fittings shown in Figure 6 is similar to the fittings 12 and 13 and corresponding parts have been given the same reference numerals with a prime added. In this fitting, the lugs 37' and 42' have been transposed with respect to the position of the corresponding lugs in fittings 12 and 13. This requires that supporting link 41' be a tension member rather than a compression member as are links 40, and also requires that slot 36' incline downwardly and forwardly instead of downwardly and rearwardly as is slot 36. This fitting has also been shown attached to a bumper comprising a single bar having an ovular face, the member 30' being bent to conform to the contour of the bumper bar.

The modified form of attaching fitting shown in Figures 7 and 8 comprises a vertical member 60 of generally U-shaped cross section. Flange 60a is made somewhat wider than flange 60b to provide means for attaching the rack and supporting link thereof. The clamping face of member 60 is shaped to provide upper and lower transversely convex vertically straight faces 61 and 62 for contact with the flat faces of conventional double flat bar bumpers. Intermediate the faces 61 and 62 is provided a portion 63 the face of which is concave vertically and convex transversely for contact with the convex face of bumpers of the type comprising a single bar of ovular cross section.

The bumper bar or bars are clamped between member 60 and a flat straight member 65 by means of bolts 66 projecting through slots 67, 68 and 69 in the three faces 61, 62 and 63, respectively, of member 60 and holes aligned therewith in member 65. When the fitting is attached to a bumper comprising a single bar as shown in Figure 7, the center slot and hole are not used, whereas all three may be used when the fitting is attached to a bumper of the double bar type, the center bolt in such case passing between the two bumper bars.

The heads 74 of the bolts are formed relatively narrow to permit the bolts to take any position in the slots within the limits of the length thereof. Due to the transversely convex curvature of the faces 61, 62, and 63 of member 60 in which the three slots are provided, the clamping bolts 66 will extend radially relative to the curved faces of the member in all positions of the bolts in the slots. This permits the fittings to be securely clamped to the face of a bumper at an appreciable angle thereto, which makes it possible to clamp two such fittings of a carrier in parallelism even though the portions of the bumper at which the fittings are attached are at an angle to one another. The vertically concave transversely convex portion intermediate the upper and lower vertically straight transversely convex portions makes it possible to attach the fittings on a bumper of either the double flat bar type, or of the single bar ovular type, as well as the type comprising a single bar of sinusoidal cross section.

It is this particular shaping of the fitting which makes it universally adaptable to the several knds of bumpers, and which I regard as an important part of the invention.

The modified carrier shown in Figures 9 to 12 comprises a rack 80 supported on a pair of fittings 81 and 82 clamped to the rear bumper 83 through the agency of a pair of adapters 84 and 85. The rack 80 is of similar construction to that of rack 11 previously described. In this carrier, however, the rack 80 is used in a position reversed to that shown in the carrier of Figures 1 to 8. The side used as the bottom in the previously described rack is here used as the top, the inturned portions of the margins of openings 86 defining the luggage carrying surface of the rack. Openings 86 correspond to openings 26 in rack 11.

The fittings 81 and 82 are of an improved form, carrying forward in general the features of the fitting forming the subject matter of my copending application Serial No. 619,904, filed June 29th, 1932. Each fitting comprises a member bent along a vertical line to form a clamping flange 87 and a rearwardly extending flange 88. Flange 88 is notched out as shown at 89 to render flange 87 sufficiently yieldable to take the shape of the bumper when clamped directly to a bumper, as is more specifically described in my copending application.

The rack 80 is connected to fittings 81 and 82 by means of a pair of relatively short links 90 pivoted at their upper ends to the opposite sides of the rack adjacent the front corners by means of pivots 92. The lower ends of links 90 are pivoted to the central portion of the flange 88 of the two fittings, respectively, by means of pivots 94. A rearwardly bent hook 95 is formed on the upper end of clamping flange 87 of each fitting and is adapted to engage over the upturned front side 96 of the rack 80, when the rack is in its horizontal luggage receiving position. Pivots 92 are disposed a short distance rearwardly of the upturned end 96 of the rack 80, as a result of which the rack can be disengaged from hook 95 by swinging the rack upwardly about pivots 92 and then moving the rack rearwardly bodily.

The rack 80 is held in a horizontal luggage receiving position by a pair of supporting links 97, one on each side of the rack. Each supporting link is pivotally connected to the lower end of flange 88 of the adjacent fitting, and is slidably connected to the rack by means of a bolt 98 disposed in slot 99 in guide 100 provided on each side of the rack. Slots 99 are so positioned that when bolts 98 are against the rear end thereof and the upturned end 96 of the rack is engaged by hooks 95, the rack will be held in a horizontal luggage receiving position.

After the rack has been disengaged from hooks 95, it may either be lowered to a position shown in dotted lines in Figure 10, or it may be swung up to its inoperat've position shown in Figure 11. If not held in the position shown in dotted lines in Figure 10, the rack will swing to the ground about pivots 92. The rack is held in the position shown in Figure 11 by the engagement of a semi-spherical boss 101, formed on the outer face of flange 88, in a semi-spherical recess 102 formed in the inner side of link 97. The central portion of flange 88 is offset inwardly as shown at 103 an amount equal to the thickness of the outer head of pivot 94 so that link 97 will not come in contact with the head of pivot 94 when the rack is swung upwardly into the position shown in Figure 11.

While the fittings 81 and 82 may be clamped directly to the rear face of a bumper or bumperette when nothing extends rearwardly to interfere with the rack in the position it will then assume, in this case they have been shown clamped to especially provided adapters 84 and 85 to space the rack rearwardly sufficiently to clear the rear tire 104 which is shown as projecting rearwardly beyond the plane of the face of the bumper 83 at the points where the carrier is connected to it. Adapters 84 and 85 each comprise a figure 8 shaped casting having an upper loop 105 and a lower loop 106, connected by a web 107. The rear side of loops 105 and 106 are apertured to receive bolts 108 and 109 by which the fittings are clamped to the adapters. Bolts 108 and 109 also pass through two of the perforations 110 in flange 87 aligning with the apertures in the adapters.

The front side of the adapters is formed with upper and lower straight portions 111 and 112 and an intermediate curved portion 113 similar to the clamping faces of the fitting 60 shown in Figures 7 and 8 for the same purpose, namely to fit bumpers of different contours. In the present case adapters are shown clamped to a bumper comprising a single relatively wide bar of ovular cross-section. They are clamped thereto by means of bolts 114 passing through perforations provided in the rear sides of loops 105 and 106, and through aligned holes in the clamping strap 116.

What I claim as my invention and desire to have protected by Letters Patent is:—

1. A luggage carrier rack comprising a sheet metal stamping having a plurality of openings in the surface thereof, the margins of which are double drawn to bring the metal immediately adjacent the openings in a plane spaced from and parallel to the plane of the surface of the rack, and having its sides and ends bent at right angles to the plane of the rack, and a reinforcing strip embracing the rack and affixed to the bent sides and ends thereof in juxtaposition therewith.

2. A luggage carrier rack comprising a sheet metal stamping having square notched corners and having its sides and ends bent at right angles to the plane of the rack with the sides of the notches in juxtaposition, and a reinforcing strip embracing the rack and affixed to the bent sides and ends thereof in juxtaposition therewith, the abutting ends of the reinforcing strip being disposed between two corners of the rack at points spaced from both of said corners.

3. A luggage carrier rack comprising a sheet metal stamping having its sides and ends bent at right angles to the plane of the rack, and a reinforcing strip embracing the rack and affixed to the bent sides and ends thereof in juxtaposition therewith, short sections of the reinforcing strip being offset outwardly in spaced relation to the front and to the rear of the rack at spaced points to provide strap loops.

4. A luggage carrier consisting of a rack comprising a sheet metal stamping having its sides and ends bent at right angles to the plane of the rack, and a reinforcing strip embracing the rack and affixed to the bent sides and ends thereof in juxtaposition therewith, sections of the reinforcing strip being offset outwardly in spaced relation to the sides of the rack, said outwardly offset portions having elongated slots therein to form guides, pivot bolts disposed in said slots, a pair of fittings by which the carrier may be attached to an automobile bumper and to which said rack is pivotally connected at one end, and a pair of supporting links disposed on opposite sides of the rack and pivoted to said fittings and to said pivot bolts.

5. The combination with a luggage carrier mounted for vertical swinging motion, of a pair of attaching fittings therefor to which the carrier is pivoted, each fitting including a member having upper and lower vertically straight transversely convex faces and an intermediate vertically concave transversely convex face, whereby said members may be clamped to either a flat faced or an ovular faced support and in a position of parallelism notwithstanding the portions of the support to which the two members are clamped may be at an angle to each other, and bolts for clamping said members to said support.

6. The combination with a luggage carrier mounted for vertical swinging motion, of a pair of attaching fittings therefor to which the carrier is pivoted, each fitting including a member of generally U-shaped cross-section and having upper and lower vertically straight transversely convex faces and an intermediate vertically concave transversely convex face, a transverse slot in each face, and bolts extending through said slots for clamping said members to a support.

7. A luggage carrier consisting of a rack comprising a sheet metal stamping having its sides and ends bent at right angles to the plane of the rack, and a reinforcing strip embracing the rack and affixed to the bent sides and ends thereof in juxtaposition therewith, sections of the reinforcing strip being offset outwardly in spaced relation to the sides of the rack, a pair of fittings by which the carrier may be attached to an automobile bumper and to which said rack is pivotally connected at one end, and a pair of supporting links disposed on opposite sides of the rack and pivoted to said fittings and having sliding engagement with said sections.

8. A luggage carrier consisting of a rack comprising a sheet metal stamping having its sides and ends bent at right angles to the plane of the rack, and a reinforcing strip embracing the rack and affixed to the bent sides and ends thereof in juxtaposition therewith, sections of the reinforcing strip being offset outwardly in spaced relation to the sides of the rack, pivot means slidingly supported on said offset portions, a pair of fittings by which the carrier may be attached to an automobile bumper and to which said rack is pivotally connected at one end, and a pair of supporting links disposed on opposite sides of the rack and pivoted to said fittings and to said pivot means.

9. A luggage carrier comprising a rack, a pair of attaching fittings, and means connecting said rack to said fittings comprising a pair of relatively short upwardly extending links pivotally connected at their upper ends to the rack, one on each side thereof adjacent the front corners thereof, and at their lower ends to said fittings, hooks on said fittings engaging said rack to prevent said rack from swinging upon said links away from said fittings when said rack is in a horizontal luggage receiving position whereby the front end of said rack is supported by the fittings through said links, and from which said rack may be disengaged by swinging the rack upwardly about the upper ends of said links and thereafter downwardly about the lower ends of said links, and separate means for supporting the rear end of said rack from said fittings at a level to dispose the rack in a horizontal luggage receiving position, when said rack is in engagement with said hooks.

10. A luggage carrier comprising a rack, a pair of attaching fittings, and means connecting said rack to said fittings comprising a pair of relatively short links upwardly extending pivotally connected at their upper ends to the rack, one on each side thereof adjacent the front corners thereof, and at their lower ends to said fittings, said links being in a substantially vertical position when said rack is in a horizontal luggage receiving position, disconnectible means for preventing said rack from swinging upon said links away from said fittings whereby the front end of said rack is supported by said fittings through said links stressed in compression, and separate means for supporting the rear end of said rack at a level to dispose the rack in a horizontal luggage receiving position, when the front end of said rack is supported by said links.

11. A luggage carrier comprising a rack, a pair of attaching fittings, means connecting said rack to said fittings comprising a pair of relatively short upwardly extending links pivotally connected at their upper ends to the rack, one on each side thereof adjacent the front corners, and at their lower ends to said fittings, hooks on said fittings engaging said rack at points spaced forwardly of the points of pivotal connection of said links with said rack, and from which said rack may be disengaged by swinging the rack upwardly about the upper ends of said links and thereafter downwardly about the lower ends of said links, and a pair of upwardly and rearwardly extending supporting links slidably and pivotally connected at their upper ends to the rack, one on each side thereof, and pivotally connected at their lower ends to said fittings for supporting said rack in a horizontal luggage receiving position when the rack is in engagement with said hooks.

12. A luggage carrier comprising a rack, a pair of attaching fittings, means connecting said rack to said fittings comprising a pair of relatively short upwardly extending links pivotally connected at their upper ends to the rack, one on each side thereof adjacent the front corners, and at their lower ends to said fittings, hooks on said fittings engaging said rack at points spaced forwardly of the points of pivotal connection of said links with said rack, and from which said rack may be disengaged by swinging the rack upwardly about the upper ends of said links and thereafter downwardly about the lower ends of said links, and separate means connected to said fittings and engaging the sides of said rack at points spaced rearwardly from the points of connection of said links with said rack for supporting said rack in a horizontal luggage receiving position when the rack is in engagement with said hooks.

13. A luggage carrier comprising a rack, a pair of attaching fittings, and means connecting said rack to said fittings comprising a pair of upwardly extending links pivotally connected at their upper ends to the rack, one at each side thereof adjacent the front corners thereof, and at their lower ends to said fittings, disconnectible means for preventing said rack from swinging upon said links downwardly and rearwardly away from said fittings, whereby the front end of said rack is supported in a luggage receiving position, and separate means connected to said fittings and engaging the sides of said rack at points spaced rearwardly from the points of connection of said links with said rack to support the rear end of said rack in a luggage receiving position when the front end is so supported.

14. A luggage carrier rack comprising a sheet metal stamping having a plurality of openings in the surface thereof, the margins of which are drawn to bring the metal immediately adjacent the openings in a plane spaced from and parallel to the plane of the surface of the rack and having its sides and ends bent at substantially right angles to the plane of the rack, and reinforcing means embracing the rack and affixed to the bent sides and ends thereof.

15. A luggage carrier rack comprising a sheet metal stamping having a plurality of openings in the surface thereof, the margins of which are drawn to bring the metal immediately adjacent the openings in a plane spaced from and parallel to the plane of the surface of the rack, and reinforcing means embracing the rack and affixed to the sides and ends thereof.

16. A luggage carrier rack comprising a sheet metal stamping having a plurality of openings in the surface thereof, the margins of which are drawn to bring the metal immediately adjacent the openings in a plane spaced from and parallel to the plane of the surface of the rack and having its sides and ends bent at substantially right angles to the plane of the rack to add rigidity to the rack.

17. A luggage carrier comprising a rack, a pair of attaching fittings, and means connecting said rack to said fittings comprising a pair of relatively short upwardly extending links pivotally connected at their upper ends to the rack, one on each side thereof adjacent the front corners thereof, and at their lower ends to said fittings, said links being in a substantially vertical position when said rack is in a horizontal luggage receiving position, means for preventing said rack from swinging upon said links away from said fittings whereby the front end of said rack is supported by said fittings through said links stressed in compression, a second pair of relatively long upwardly and rearwardly extending links connected at their lower ends to said fittings and at their upper ends to the rack, one on each side thereof at points spaced rearwardly from the front corners thereof for supporting the rear end of said rack at a level to dispose the rack in a horizontal luggage receiving position when the front end of said rack is supported by said relatively short links, one end of one pair of links being disconnectible to permit said rack to be swung upon the other pair of links out of a horizontal luggage receiving position.

GUSTAV C. MONCKMEIER.